United States Patent [19]

Maldonado

[11] Patent Number: 4,902,026
[45] Date of Patent: Feb. 20, 1990

[54] CONVERTIBLE CAR SEAT APPARATUS

[76] Inventor: Robert L. Maldonado, 7516 Frederick La. SW, Albuquerque, N. Mex. 87105

[21] Appl. No.: 310,932

[22] Filed: Feb. 16, 1989

[51] Int. Cl.$^4$ .............................................. B62B 7/12
[52] U.S. Cl. ........................................ 280/30; 280/37; 280/643; 280/650; 297/184; 297/488
[58] Field of Search ............... 297/130, 184, 250, 487, 297/488; 280/30, 37, 642, 643, 647, 648, 650, 47.38

[56] References Cited

U.S. PATENT DOCUMENTS

| | | | |
|---|---|---|---|
| 2,435,733 | 2/1948 | Belyeu | 280/30 |
| 2,607,396 | 8/1952 | Stambaugh, Jr. | 280/648 |
| 3,094,339 | 6/1963 | Hurvitz | 280/31 |
| 3,116,069 | 12/1963 | Dostal | 280/30 |
| 3,290,050 | 12/1966 | Ezquerra | 280/30 |
| 3,679,223 | 7/1972 | Sakal | 280/37 |
| 4,641,844 | 2/1987 | Mar et al. | 280/30 |
| 4,762,331 | 8/1988 | Tucker et al. | 280/643 X |
| 4,832,354 | 5/1989 | LaFrehiere | 280/30 |

Primary Examiner—Charles A. Marmor
Assistant Examiner—Michael Mar
Attorney, Agent, or Firm—Leon Gilden

[57] ABSTRACT

A convertible car seat apparatus is set forth wherein an "L" shaped car seat is provided with a pivotally mounted "U" shaped frame mounted to the sides of the car seat wherein the frame, when positioned in a first downward position, retracts the associated wheels of the car seat underlying the seat wherein pivoting of the "U" shaped frame to a position overlying the seat in a second position extends the wheels of the car seat and further enables extension of a sunshade positioned within the "U" shaped frame, as well as the removal of a padded abutment member positioned between the shade and the seat. Further, storage pouches are secured to the sides and rear surface of the seat for storage of articles associated with the care of an associated infant within the seat.

7 Claims, 5 Drawing Sheets

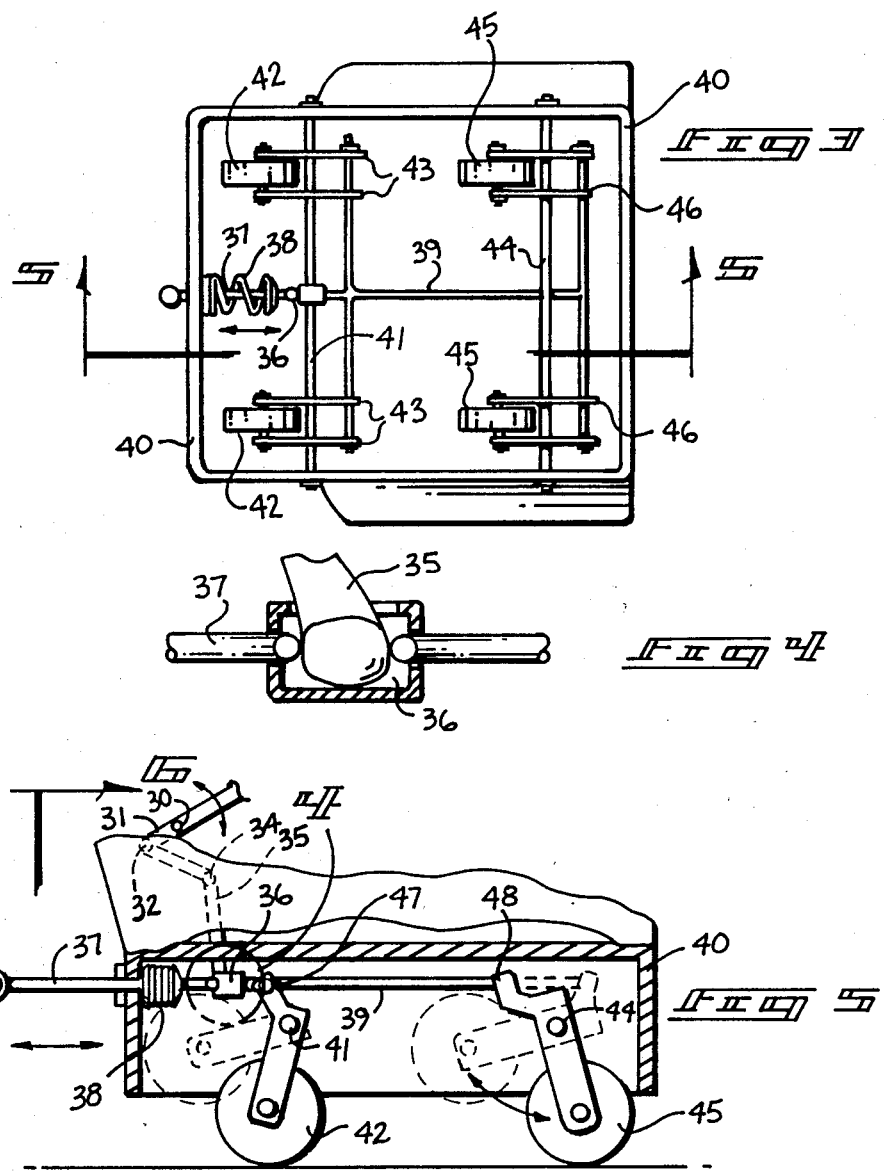

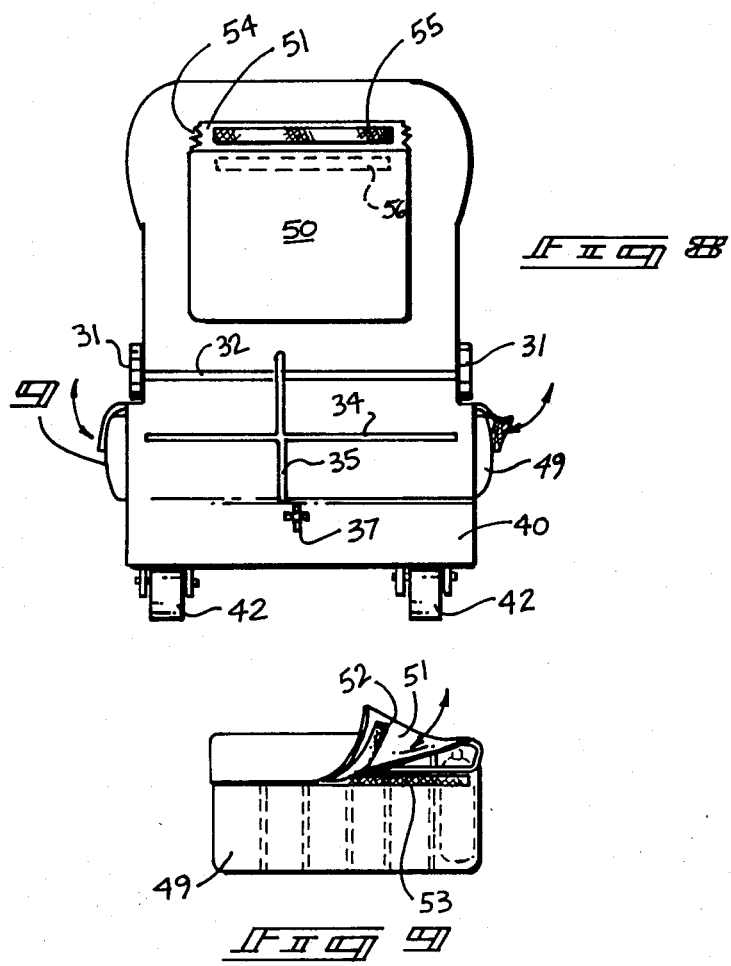

CONVERTIBLE CAR SEAT APPARATUS

BACKGROUND OF THE INVENTION

1. Field of the Invention

The field of invention relates to car seat apparatus, and more particularly pertains to a new and improved convertible car seat wherein the same is provided with a forward pivotally mounted frame to extend and retract stroller wheels associated with the car seat, as desired.

2. Description of the Prior Art

The use of convertible car seats has been utilized in the prior art wherein the convertible car seats have conventionally been of complex organizations relatively cumbersome in conversion from a car seat to a stroller arrangement. Various linkages have been utilized to effect the conversion of a car seat to a stroller arrangement, but have heretofore failed to provide the benefits of the instant invention utilizing a single "U" shaped forwardly mounted frame to extend and retract the stroller wheels of the car seat, as desired. For example, U.S. Pat. No. 2,435,733 to Belyeu utilizes a car seat that is removable from a framework to reposition the car seat at various portions of the framework to orient the seat in a car seat or a stroller arrangement. The Belyeu patent fails to provide the stability and unitary construction of the instant invention not requiring the repositioning of the car seat, but merely the retraction and extension of the associated stroller wheels.

U.S. Pat. No. 2,607,396 to Stambaugh sets forth a convertible car seat wherein the same utilizes telescopingly mounted rear wheels for extension in association of the wheels in a stroller arrangement. The Stambaugh patent does not provide the advantages of the instant invention that merely employs a single "U" shaped pivotally mounted frame to extend and retract stroller wheels from a first position nested within a downwardly depending skirt of the car seat to a second position extending outwardly of the skirt for use in mobile transport of an associated infant.

U.S. Pat. No. 3,094,339 to Hurbitz sets forth a convertible baby carriage wherein the same utilizes a relatively complex organization of inter-related links to utilize the baby carriage from a stroller to a bed and to a car seat.

U.S. Pat. No. 3,116,069 to Dostal sets forth a combination car seat and stroller wherein the seat of the stroller is removable from the framework to enable use in association with a car seat and is secured to the framework to provide for a stroller arrangement.

U.S. Pat. No. 4,641,844 to Mar, et al., utilizing a retractable pushing bar and folding rear rod to permit conversion of the car seat to an infant bed and the like. The wheels of the Mar patent are arranged exteriorly of the car seat in various organizations relative to the car seat and fail to provide the compact, portable, and readily storable organization of the instant invention.

As such, it may be appreciated the instant invention sets forth a new and improved convertible car seat apparatus wherein the same addresses both the problems of convenience and effectiveness in use, and in this respect, the present invention substantially fulfills this need.

SUMMARY OF THE INVENTION

In view of the foregoing disadvantages inherent in the known types of convertible car seat apparatus now present in the prior art, the present invention provides a convertible car seat apparatus wherein a single forwardly extending "U" shaped framework member enables extension or retraction of associated stroller wheels for effecting a compact organization securable to an associated car seat and conversely enables extension of the stroller wheels in a second position to enable use of the apparatus as a stroller device. As such, the general purpose of the present invention, which will be described subsequently in greater detail, is to provide a new and improved convertible car seat apparatus which has all the advantages of the prior art convertible car seat apparatus and none of the disadvantages.

To attain this, the present invention comprises a generally "L" shaped seat utilizing outwardly extending sides wherein a "U" shaped frame is pivotally mounted to the sides with a rearwardly oriented arm link of the "U" shaped frame including a through-extending actuator bar cooperating with a bell crank to reciprocate an actuator rod to extend and retract the plural pairs of stroller wheels positioned interiorly of a downwardly depending skirt of the car seat apparatus. Further, various compartments are provided for storage of items for care of an associated infant secured within the stroller. Further, a sunshade is positioned within a remote end of the "U" shaped framework adjacent a cross link to provide an extensible sunshade when the "U" shaped frame is in a second position overlying the car seat.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved convertible car seat apparatus which has all the advantages of the prior art convertible car seat apparatus and none of the disadvantages.

It is another object of the present invention to provide a new and improved convertible car seat apparatus which may be easily and efficiently manufactured and marketed.

It is a further object of the present invention to provide a new and improved convertible car seat apparatus which is of a durable and reliable construction.

An even further object of the present invention is to provide a new and improved convertible car seat apparatus which is susceptible of a low cost of manufacture with regard to both materials and labor, and which accordingly is then susceptible of low prices of sale to the consuming public, thereby making such convertible car seat apparatus economically available to the buying public.

Still yet another object of the present invention is to provide a new and improved convertible car seat apparatus which provides in the apparatuses and methods of the prior art some of the advantages thereof, while simultaneously overcoming some of the disadvantages normally associated therewith.

Still another object of the present invention is to provide a new and improved convertible car seat apparatus wherein the same utilizes a single "U" shaped frame lever to extend and retract associated stroller wheels of the car seat.

Still another object of the present invention is to provide a new and improved convertible car seat apparatus wherein the same provides a "U" shaped frame securing a retractable and extensible sunshade for use with the "U" shaped frame when in a upward or second pivoted position.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic top view of the stroller wheels positioned within the skirt of the apparatus.

FIG. 4 is an orthographic view taken in elevation of the bell crank and its association with the actuator rod mechanism of the instant invention.

FIG. 5 is an orthographic view, taken partially in section, of the stroller wheels and their relationship with the actuator mechanism of the instant invention.

FIG. 8 is an orthographic rear view, taken in elevation, of the apparatus of the instant invention.

FIG. 9 is an orthographic view, taken in elevation, of the rear pouch of the instant invention.

DESCRIPTION OF THE PREFERRED EMBODIMENT

Figure 1:
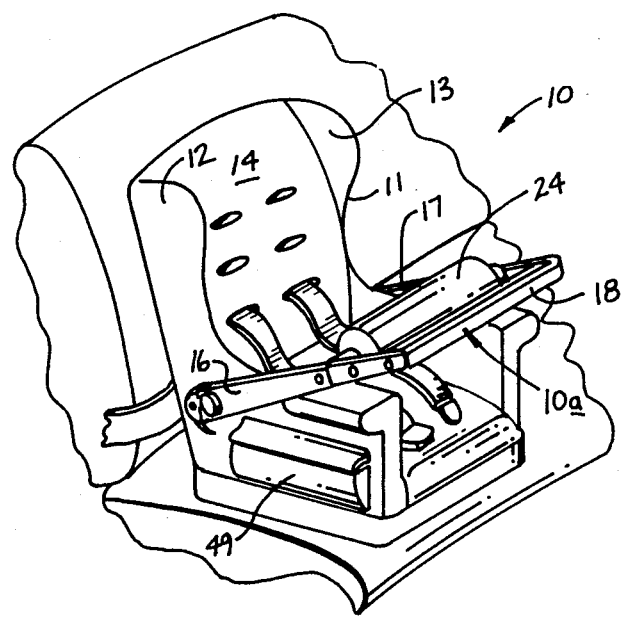
FIG. 1 is an isometric illustration of the instant invention.

With reference now to the drawings, and in particular to FIGS. 1 to 9 thereof, a new and improved convertible car seat apparatus embodying the principles and concepts of the present invention and generally designated by the reference numeral 10 will be described.

More specifically, the convertible car seat apparatus 10 essentially comprises an "L" shaped seat 11 formed with outwardly extending sides including a first side 12 and a second side 13 to define a "U" shaped interior formed with a removable padded insert 14. The padded insert includes a series of apertures to adjustably mount a pair of safety straps 15 utilizing conventional buckles for securement of an infant within the seat 11.

Figure 2:
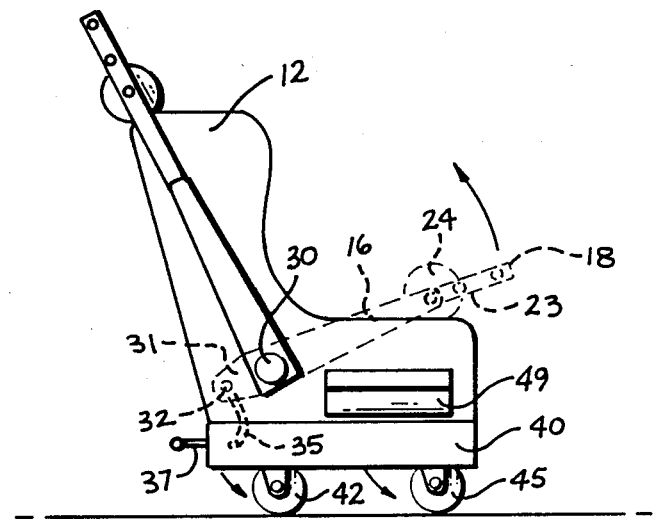
FIG. 2 is an orthographic side view taken in elevation of the instant invention.
Figure 2A:
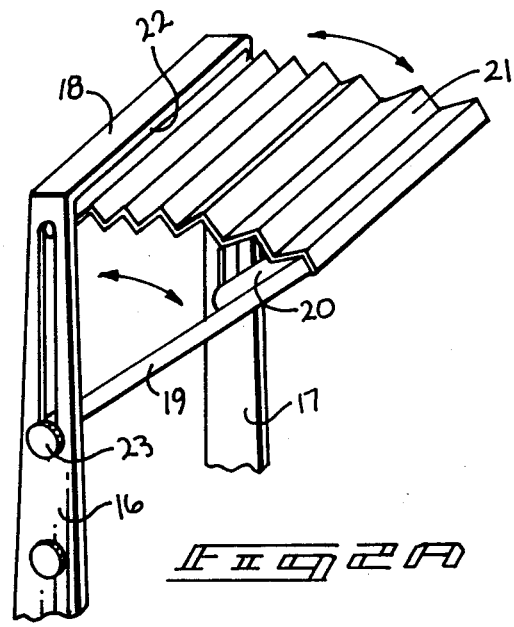
FIG. 2a is an isometric illustration of the "U" shaped frame in a second raised position with the associated sunshade extended outwardly therefrom.
Figure 2B:
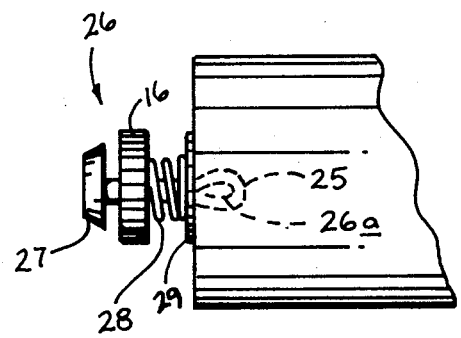
FIG. 2b is an orthographic view of the padded abutment member and its releasable association with the "U" shaped frame.
Figure 6:
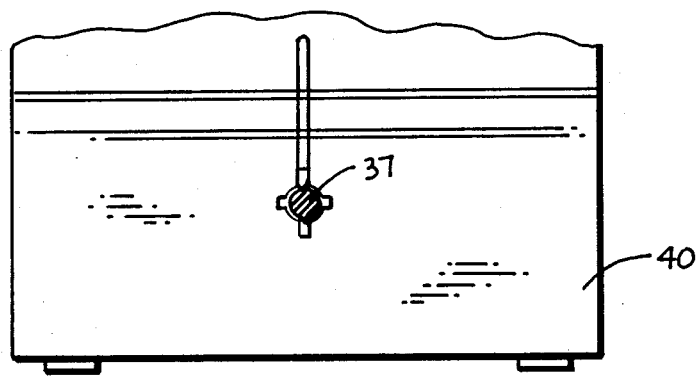
FIG. 6 is an orthographic rear view of the skirt of the instant invention.
Figure 7:
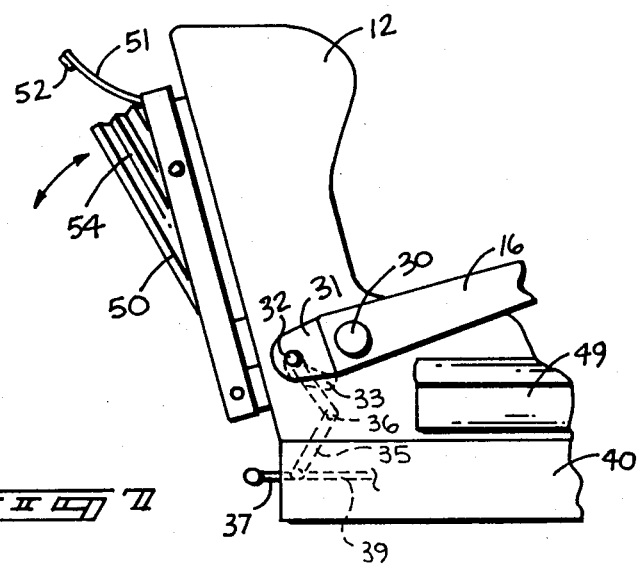
FIG. 7 is an orthographic side view, taken in elevation, of the instant invention illustrating the pouch mechanism in an extended position relative to the rear face of the car seat.

A pivotally mounted "U" shaped frame 10a mounted forwardly of seat 11 includes a first arm 16 mounted proximate the intersection of the legs of the "L" shaped seat 11 exteriorly thereof to the first side 12 parallel to a second arm 17 with a forwardly positioned connecting link 18. The first shade arm 19 is pivotally mounted interiorly of the first arm 16 proximate the connecting link 18 parallel to a second shade arm 20 spaced interiorly of the second arm 17 proximate the connecting link 19 and formed with an interconnecting flexible accordion shade 21 secured to forwardmost terminal ends of the first and second shade arms 19 and 20. The rear edge of the flexible accordion shade 21 is secured to a shade link 22 which in turn is secured interiorly of the first and second arms 16 and 17 to enable the shade 21 to be extended, as illustrated in FIG. 2a, when the "U" shaped frame 10a is pivoted from a first position, as illustrated in FIG. 1, to a second position, as illustrated in FIG. 2a, overlying the first and second sides 12 and 13. The first and second shade arms 19 and 20 are locked into the extended position, as illustrated in FIG. 2a, to a retracted position, as illustrated in FIG. 1, by friction clamps 23 threadedly mounted through the first and second arms 16 and 17 to the shade arms 19 and 20 to thereby lock the first and second shade arms 19 and 20 in the retracted or extended position, per the illustrations of FIG. 1 and 2a respectively. Spaced adjacent to and underlying the friction clamps 23 is a padded cylindrical abutment member 24 mounted between the first and second arms 16 and 17. The abutment member 24 is removably mounted to enable the "U" shaped frame to be pivoted to the upper second position. The abutment member is formed with axially aligned blind bores 25, as illustrated in FIG. 2b, to receive a projection 26a of the abutment clamp 26 spaced through each of the first and second arms 16 and 17 to secure the abutment member 24 therebetween. The clamps 26 are formed with an enlarged head 27 positioned exteriorly of the respective first and second arms 16 and 17 with a captured spring 28 secured between an abutment plate 29 fixedly mounted to the projection 26a and the respective first or second arm 16 and 17. The clamp 26a as illustrated in FIG. 2b as associated with the first arm 16 for purposes of illustration with the identical clamp 26 secured to the second arm 17. Removal of the abutment member 24 merely requires the manual grasping of each head 27 and reciprocating the heads outwardly of the first and second arms 16 and 17 to withdraw the associated projection 26a from within the blind bores 25 of the abutment member 24.

Each of the first and second arms 16 and 17 includes pivot clamps 30 positioned and spaced from the respective lower terminal end of the respective first and second arms 16 and 17 wherein the pivot clamps 30 are threadedly mounted into the frame of each first and second respective side 12 and 13 wherein the first and second arms 16 and 17 are pivotally mounted about these frame clamps with a rear arm projection 31 spaced from the pivot clamps 30 to the rearward terminal ends of the first and second arms 16 and 17. An actuator bar 32 is mounted orthogonally through the rear arm projections 31 to link the first and second arms together. The actuator bar 32 is pivotal within a slot 33 formed within the side walls 12 and 13 respectively of the seat 11. A pivot rod 34 is mounted below and parallel to the actuator bar 32 and includes a bell crank 35, as illustrated in FIG. 5 for example, mounted with its fulcrum about the pivot rod 34 and an upper link pivotally mounted to the actuator bar 32 with its lower link secured to a socket 36. The socket 36 is illustrated in FIGS. 4 and 5 as a coupling transmitting reciprocating motion to an indicator rod 37 projecting rearwardly through a downwardly depending rigid seat skirt 40 positioned underlying the seat 11 with a forward actuator rod 39 aligned with the indicator rod 37 to actuate the stroller linkage of the instant invention. An indicator rod spring 38 is captured between an interior rear wall of the skirt 40 to bias the stroller wheels comprising an axially aligned wheel pair 42 and a forwardly mounted second wheel pair 45. A first axle 41 axially secures the first wheel pair 42 together with a second axle 44 axially aligning and securing the second wheel pair together wherein the first and second axles respectively are directed through the sides of the skirt 40. Each wheel of the first wheel pair 42 is sandwiched between a pair of first wheel brackets 43 with a first wheel pair rod 47 spaced above the first axle 41 and pivotally connected orthogonally to the actuator rod 39. Similarly, a second wheel pair rod 48 is pivotally mounted to the actuator rod 39 and pivotally mounted through the second wheel brackets 46. Upon the "U" shaped frame being pivoted from a lowered first position, as illustrated in FIG. 1, to a raised upper position, the bell crank 35 is rotated whereupon the actuator rod 39 is reciprocated rearwardly, as illustrated in FIG. 5, to direct the first and second wheel pair 42 and 45 downwardly, as illustrated in FIG. 5, from the upper first position, illustrated in phantom in FIG. 5.

Each side of the seat 11 includes a compartmentalized side pouch 49 and a rear pouch 50, as illustrated in FIGS. 1 and 8 for example. The side pouch 49 is formed with a cover flap 51 with a first hook and loop fastener member 52 securable to a second hook and loop fastener 53 formed to a forward face of the side pouch 49. The rear pouch 50 includes accordion pleated sides 54 for securement of various articles therewithin and is formed with a rear pouch hook and loop fastener strip 55 formed to a forward edge of the rear pouch 50 and securable to a hook and loop fastener patch 56 secured to a forward interior edge of the rear pouch 50 to secure the rear pouch 50 in a closed configuration, as desired.

The manner of usage and operation of the instant invention should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A convertible car seat apparatus comprising:
   an "L" shaped seat including a first flange side and a second flange side positioned on either side of the seat with an underlying downwardly depending skirt positioned under the seat, a first pair of spaced wheels and a second pair of spaced wheels, said first and second pair of wheels being mounted for pivotal movement between a retracted position within said skirt and an extended position, said first pair of wheels including a first wheel rod and said second pair of wheels including a second wheel rod, said first wheel rod being spaced rearwardly of and parallel to said second wheel rod, an actuator rod pivotally mounted orthogonally to said first wheel rod and said second wheel rod, a "U" shaped frame means including a first arm and a second arm pivotally mounted to said first and second sides respectively for pivotal movement from a lowered first position forwardly of said seat to a raised second position above said seat, said frame means including a connection link forming a handle and secured between the forward terminal ends of said first and second arms for maintaining said arms in a spaced parallel relationship, each of said first and second arms including a rear arm projection with an actuator bar extending therethrough, said actuator bar being pivotally mounted to the upper leg of a bell crank, the lower leg of the bell crank extending into a socket, said actuator rod being secured to the forward end of said socket, an indicator rod extending rearwardly through a rear wall of said skirt for movement between retracted and extended positions relative to said skirt, the forward end of said indicator rod being secured to the rearward end of said socket, wherein movement of said "U" shaped frame between said first and said second positions results in movement of said wheels and said indicator rod between said retracted and said extended positions respectively.

2. A convertible car seat apparatus as set forth in claim 1 wherein a first shade arm is pivotally mounted interiorly to and adjacent the first arm with a second shade arm pivotally mounted to and spaced interiorly of the second arm with a flexible accordion shade secured between the shade arms at a forwardmost end of the shade with rearwardmost end of the shade secured to the first and second arms to enable the shade arms to pivot forwardly to extend the flexible accordion shade when the "U" frame means is in the second seat position.

3. A convertible car seat apparatus as set forth in claim 2 wherein a cylindrical padded abutment member is mounted below the first and second shade arms and includes first and second abutment clamps resiliently projecting through the first and second arms respectively with a forward projection secured to each clamp receivable within blind bores axially aligned with and formed at terminal ends of the abutment member.

4. A convertible car seat apparatus as set forth in claim 1 further including at least one side pouch mounted to the first side wherein the side pouch is compartmentalized and includes hook and loop fasteners to secure an overlying flap of the side pouch to a forward cover of the side pouch.

5. A convertible car seat apparatus as set forth in claim 4 further including a rear pouch secured to a rear surface of the seat, and the rear pouch includes accordion pleated sides to enable extension of the rear pouch with a hook and loop fastener strip secured to a forward interior surface of the rear pouch, and a hook and loop fastener patch mounted to an opposed surface to secure the rear pouch in a closed configuration.

6. A convertible car seat apparatus as set forth in claim 5 wherein the indicator rod includes a spring member captured between an interior surface of the skirt to bias the indicator rod in a position interiorly of the skirt.

7. A convertible car seat apparatus as set forth in claim 6 wherein each wheel of the first wheel pair and each wheel of the second wheel pair includes spaced parallel brackets to receive the first wheel rod and second wheel rod respectively therethrough.

* * * * *